Patented June 21, 1938

2,121,509

UNITED STATES PATENT OFFICE 2,121,509

TETRA N-ALKYL LONG CHAIN ALKYLENE DIAMINES AND PROCESS FOR PREPARING THEM

Frank Lee Pyman and Hyman Henry Lionel Levene, Nottingham, England, assignors to Boot's Pure Drug Company Limited, Nottingham, England, a British company No Drawing. Application June 16, 1936, Serial No. 85,620. In Great Britain June 19, 1935

10 Claims. (Cl. 260—127)

This invention relates to the production of di-tertiary amines and more particularly to the production of tetra-N-alkyl diamino derivatives of the paraffin series in which the number of carbon atoms of the hydrocarbon chain is any number from 8 to 12 inclusive, and the alkyl groups of the dialkyl-amino radicles are each butyl or amyl. The general formula of the bodies in question is therefore $R_1R_2N(CH_2)_nNR_3R_4$ where "$n$" is an integer from 8 to 12 inclusive and $R_1$, $R_2$, $R_3$ and $R_4$ are the same or different alkyl groups. These substituted diamines are found to have very considerable amoebicidal properties of the same order of activity as emetine and are of value in the treatment of certain diseases.

According to the present invention, the desired di-tertiary amine is formed by heating at a suitable temperature an N-dialkyl amino derivative of an alkyl halide having the general formula $R_1R_2N(CH_2)_nX$, where X denotes a halogen atom, with a secondary amine $NHR_3R_4$, $R_1$, $R_2$, $R_3$ and $R_4$ having the same meaning as above. The reaction which takes place may be represented by the following scheme:—

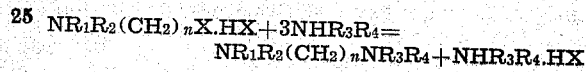

It is in some cases more convenient to use the halogen salt of the aminoalkyl halide, and in this case the reaction may be expressed as follows:—

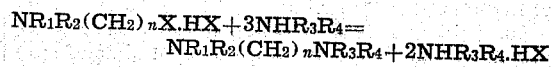

It could not have been foreseen that the reaction could be made to proceed in this way without the occurrence of side reactions which would have rendered the yield of the substance desired insufficient for the process to be worked on a practical scale. It could also not have been foreseen from published data available at the date of the present application that the compounds produced would have valuable therapeutic properties as amoebicides.

After completion of the reaction, the desired derivative is separated from the reaction mixture in any convenient way, for example, by extraction with ether and subsequent purification by distillation in vacuo. When the dialkylamine used in the reaction is soluble in water, it may be convenient to separate the desired derivative from the hydrohalide of the base which is formed in accordance with the reaction scheme shown above by washing out the reaction mixture with dilute caustic soda. This decomposes the hydrohalide and dissolves the free base, leaving the desired derivative which is then finally purified as above by distillation in vacuo.

The aminohalides which are required for the reaction may be prepared as far as the chlorides are concerned by methods analogous to those disclosed in the specification of our British Patent No. 402,159, which describes a process for the production of substituted alkyl chlorides, in which the number of carbon atoms of the hydrocarbon chain is any number from 7 to 11 inclusive, by treating the appropriate aminoalcohol with a solution of thionyl chloride at a low temperature. The aminobromides may be prepared by boiling the requisite aminoalcohol with a concentrated solution of hydrobromic acid.

Some of the dialkylamines required for use in the above reactions may, in the absence of a more convenient process, be produced by hydrolysis of the corresponding para-toluenesulphonamides— $CH_3.C_6H_4.SO_2NR_1R_2$—which may be obtained by treating the sodium salt of para-toluenesulphonamide successively with alkyl bromides or other suitable derivatives such as alkyl chlorides or toluenesulphonates.

In order that the invention may be clearly understood and readily carried into effect, some examples of the methods by which the invention may be effected will now be described. It will be understood, however, that the aminoalkyl halides and bases used in the examples given are merely representative of a very wide series of similar compounds which may be used for the purposes of the invention.

Example 1

In the preparation of a α,κ-di-n-butylamino-di-n-amylamino-n-decane, κ-chloro-n-decyldi-n-amylamine (100 parts) and di-n-butylamine (81 parts) are heated together for 48 hours on the steam bath. The reaction mass is allowed to cool, triturated with anhydrous ether and filtered to remove the di-n-butylamine hydrochloride which has been formed. Ether is now removed from the filtrate and the residue is distilled in vacuo, when the required product is obtained as an oil boiling at 265°–270° C. under a pressure of 28 mm. of mercury.

The same base also results when α,κ-chloro-n-decyldi-n-butylamine is caused to react in a similar manner with di-n-amylamine.

Example 2

In the preparation of α,κ-tetra-n-amyldiamino-n-undecane, κ-bromo-n-undecyldi-n-amylamine hydrobromide is heated with an equal weight of di-n-amylamine for 36 hours on the steam bath, and the product is worked up as described in the first example. The desired base boils at 272°–275° C. under a pressure of 28 mm. of mercury. The crystalline di-hydrochloride melts at 72° C.

*Example 3*

In the preparation of $\alpha,\lambda$-tetra-n-amyldiamino-n-undecane, 5 parts of di-n-amylamino-n-undecyl alcohol are refluxed for two hours with 50 parts concentrated hydrobromic acid, the supernatant layer of oil separated, washed with a small quantity of cold water and the residue heated for two days at 100° C. with 8 parts di-n-amylamine. The product is obtained in the usual way as an oil boiling at 272°–275° C. under 18 mm. pressure; or—

12 parts di-n-amylamino-n-undecyl alcohol are converted to chloro-n-undecyl di-n-amylamine hydrochloride by treating with excess of thionyl chloride in chloroform solution below 0° C., and chloroform and excess thionyl chloride removed in vacuo at as low a temperature as possible. The residue is heated with 18 parts of di-n-amylamine for 48 hours at 120° C.

The cooled product is triturated with ether, di-n-amylamine hydrochloride is filtered off by suction and the residual oil purified by distillation in vacuo.

*Example 4*

In the preparation of $\alpha,\lambda$-tetra-n-butyldiamino-n-undecane, 11 parts di-n-butylamino-n-undecyl alcohol are refluxed for 2 hours with 55 parts concentrated hydrobromic acid, and the oily bromo-n-undecyl di-n-butylamine hydrobromide so obtained separated, washed with a little cold water, and heated for 48 hours at 100° C. with 17 parts di-n-butylamine. The product is isolated as described in previous examples, and boils at 219°–222° C. under 3 mm. pressure.

We claim:—

1. The process for the production of a tetra-N-alkyl diamino derivative of the paraffin series, which consists in reacting a dialkylamine with a substance from the group consisting of the N-dialkyl amino derivatives of the halide of a hydrocarbon of the paraffin series containing a number of carbon atoms from 8 to 12 inclusive and the hydrohalides of said N-dialkyl amino derivatives the alkyl groups in the said reacting substances being drawn from the group consisting of butyl and amyl.

2. The process for the production of a tetra-N-alkyl diamino derivative of the paraffin series, which consists in the steps of heating until completion of the reaction, a dialkylamine with a substance from the group consisting of the N-dialkyl amino derivatives of the halide of a hydrocarbon of the paraffin series containing a number of carbon atoms from 8 to 12 inclusive and the hydrohalides of said N-dialkyl amino derivatives, the alkyl groups in the said reacting substances being drawn from the group consisting of butyl and amyl, separating the desired derivative from the reaction mixture, and purifying said derivative by distillation.

3. The process for the production of a tetra-N-alkyl diamino derivative of the paraffin series, which consists in the steps of heating until completion of the reaction, a dialkylamine with a substance from the group consisting of the N-dialkyl amino derivatives of the halide of a hydrocarbon of the paraffin series, containing a number of carbon atoms from 8 to 12 inclusive and the hydrohalides of said N-dialkyl amino derivatives, the alkyl groups in said reacting substances being drawn from the group consisting of butyl and amyl, dissolving the desired derivative in an organic solvent, separating said derivative in solution from the reaction mixture by filtration, and purifying said derivative by distillation.

4. The process for the production of $\alpha,\kappa$-di-n-butylamino-di-n-amylamino-n-decane, which comprises heating one molecular proportion of $\kappa$-chloro-n-decyldi-n-amylamine with about two molecular proportions of di-n-butylamine until completion of the reaction, separating the desired derivative from the reaction mixture, and purifying said derivative by distillation.

5. The process for the production of $\alpha,\kappa$-tetra-n-amyldiamino-n-undecane which comprises heating one molecular proportion of $\kappa$-bromo-n-undecyldi-n-amylamine hydrobromide with about three molecular proportions of di-n-amylamine until completion of the reaction, separating the desired derivative from the reaction mixture, and purifying said derivative by distillation.

6. The process for the production of $\alpha,\lambda$-tetra-n-amyldiamino-n-undecane which comprises heating one molecular proportion of $\lambda$-chloro-n-undecyl-di-n-amylamine hydrochloride with about three molecular proportions of di-n-amylamine until completion of the reaction, separating the desired derivative from the reaction mixture, and purifying said derivative by distillation.

7. The amoebicidal product $\alpha,\kappa$-di-n-butylamino-di-n-amylamino-n-decane.

8. The amoebicidal product $\alpha,\kappa$-tetra-n-amyldiamino-n-undecane.

9. The amoebicidal product $\alpha,\lambda$-tetra-n-amylamino-n-undecane.

10. A tetra-N,N,N',N'-alkyl diamino derivative of the paraffin series containing a number of carbon atoms from 8 to 12 inclusive in the hydrocarbon chain, in which each of the alkyl radicles of the dialkylamino groups belongs to the group consisting of butyl and amyl, and in which the two dialkyl-amino groups are dissimilar.

FRANK LEE PYMAN.
HYMAN HENRY LIONEL LEVENE.